(12) United States Patent
Parker (10) Patent No.: US 11,475,013 B2
(45) Date of Patent: Oct. 18, 2022

(54) SYSTEM, METHOD AND COMPUTER PROGRAM FOR INGESTING, PROCESSING, STORING, AND SEARCHING TECHNOLOGY ASSET DATA

(71) Applicant: Hubble Technology Inc., Reston, VA (US)

(72) Inventor: Thomas W. Parker, Washington, DC (US)

(73) Assignee: HUBBLE TECHNOLOGY INC., Reston, VA (US)

( * ) Notice: Subject to any disclaimer, the term of this patent is extended or adjusted under 35 U.S.C. 154(b) by 0 days.

(21) Appl. No.: 17/171,845

(22) Filed: Feb. 9, 2021

(65) Prior Publication Data

US 2021/0248145 A1     Aug. 12, 2021

Related U.S. Application Data

(60) Provisional application No. 62/972,006, filed on Feb. 9, 2020.

(51) Int. Cl.
*G06F 16/2455*     (2019.01)
*G06F 9/54*         (2006.01)
(Continued)

(52) U.S. Cl.
CPC ........ *G06F 16/24564* (2019.01); *G06F 9/541* (2013.01); *G06F 16/24578* (2019.01); *G06F 16/9024* (2019.01); *H04L 41/12* (2013.01)

(58) Field of Classification Search
CPC ......... G06F 16/24564; G06F 16/24578; G06F 16/9024; G06F 9/541; H04L 41/12
See application file for complete search history.

(56) References Cited

U.S. PATENT DOCUMENTS 6,782,350 B1 *  8/2004  Burnley .............. G06F 11/3089
                                                    714/E11.2
8,554,772 B2 * 10/2013  Ayars ...................... G06F 16/00
                                                    707/740
(Continued)

OTHER PUBLICATIONS

De Sousa Rodrigues, P. D. C. (2019). An OSINT Approach to Automated Asset Discovery and Monitoring. (Year: 2019).*
(Continued)

*Primary Examiner* — Dennis Truong
(74) *Attorney, Agent, or Firm* — Xsensus LLP (57) ABSTRACT

A system, method and computer program for handling inbound events on a technology network may include ingesting an inbound event from a connector, interfacing with one of different technology systems on the technology network, extracting a data element or a technology asset from the inbound event, and searching a database storing a new or existing inventory of technology assets in the technology network with respect to the data element or the technology asset. When the technology asset is extracted, a relationship between the technology asset and a record in the database is created. When the data element is extracted, a match between the data element and a record in the database is determined. When the match equals or exceeds a first predetermined threshold, the record in the database is enriched. When the match is less than a second predetermined threshold, a new technology asset in the database is created.

17 Claims, 8 Drawing Sheets

(51) Int. Cl.
*G06F 16/901* (2019.01)
*H04L 41/12* (2022.01)
*G06F 16/2457* (2019.01)

(56) References Cited

U.S. PATENT DOCUMENTS

| | | | | |
|---|---|---|---|---|
| 8,655,757 | B1* | 2/2014 | Wookey | G06Q 30/06 705/35 |
| 2003/0200294 | A1* | 10/2003 | Thorpe | H04L 41/0233 709/223 |
| 2004/0093408 | A1* | 5/2004 | Hirani | H04L 41/12 709/224 |
| 2006/0064619 | A1* | 3/2006 | Wen | G06F 9/50 714/734 |
| 2006/0178953 | A1* | 8/2006 | Aggarwal | G06Q 10/087 705/28 |
| 2007/0180059 | A1* | 8/2007 | Marl | G06Q 10/087 709/219 |
| 2008/0049644 | A1* | 2/2008 | Halbert | H04L 41/12 370/254 |
| 2008/0162308 | A1* | 7/2008 | Sharma | G06Q 10/087 705/28 |
| 2008/0307089 | A1* | 12/2008 | Sullivan | H04L 41/22 709/224 |
| 2009/0070237 | A1* | 3/2009 | Lew | G06F 16/273 705/28 |
| 2011/0218995 | A1* | 9/2011 | Ayars | G06F 16/00 707/737 |
| 2014/0101467 | A1* | 4/2014 | Jubran | H04L 41/0856 713/310 |
| 2016/0241595 | A1* | 8/2016 | Molloy | H04L 63/1408 |
| 2017/0230424 | A1* | 8/2017 | Molloy | H04L 63/1408 |
| 2017/0278004 | A1* | 9/2017 | McElhinney | G06Q 10/20 |
| 2018/0032603 | A1* | 2/2018 | Vaquero Gonzalez | G06F 16/24534 |
| 2019/0332572 | A1* | 10/2019 | Lerner | G06F 16/24564 |
| 2021/0157671 | A1* | 5/2021 | Shastri | H04L 41/22 |

OTHER PUBLICATIONS

International Search Report and Written Opinion dated Apr. 28, 2021 in International Application PCT/US21/17255.

* cited by examiner

SYSTEM, METHOD AND COMPUTER PROGRAM FOR INGESTING, PROCESSING, STORING, AND SEARCHING TECHNOLOGY ASSET DATA

This application claims priority to U.S. Provisional Application Ser. No. 62/972,006 filed Feb. 9, 2020, whose entire contents are incorporated herein by reference.

BACKGROUND

Organizations are increasingly challenged in their ability to gather, store and query information regarding their ever-evolving technology assets. In this innovation, a technology asset is described broadly as a digital item of value owned [or leased from a third party]; including physical, virtual, mobile, cloud, industrial or data itself. Such technology assets may include, but are not limited to desktop computer systems, physical technology hardware, applications, software containers, databases, cloud services, microservices, industrial control systems, IoT devices, workloads, user identity data, network domains, virtual servers, machine learning models, or a repository of data, binaries or source code supporting a specific business function. This challenge is amplified by the rapid evolution of information technology systems, both in their nature and applications within public and private sector organizations.

Significant business risks arise when a company is not able to understand the volume and nature of its technology assets, including digital assets. The proliferation of technologies such as 5G, cloud computing and rapid pivot to digital business increases the need for and complexity of understanding those assets. Companies are currently adopting enabling and cost saving technologies, e.g., artificial intelligence, business process automation technologies and machine learning. However, adopting these technologies will not be successful without a reliable understanding of a company's assets. Further, increasingly aggressive regulations require keeping an accurate ledger of technology assets.

SUMMARY

One or more embodiments is directed to a system, including circuitry coupled to different technology systems on a technology network; and a database storing a new or existing inventory of technology assets in the technology network and coupled to the circuitry. The circuitry is configured to ingest an inbound event from one of the different technology systems, extract at least one data element from the inbound event or at least one technology asset from the inbound event, search the database with respect to the at least one data element or the at least one technology asset, and determine a correspondence between the at least one data element or the at least one technology asset and at least one record in the existing inventory. On condition that the at least one technology asset is extracted, create a relationship between the at least one technology asset and the at least one record in the database. On condition that the at least one data element is extracted, determine a match between the at least one data element and the at least one record in the existing inventory. On condition that the match equals or exceeds a first predetermined threshold, enrich the at least one record in the database. On condition that the match is less than a second predetermined threshold, create a new asset in the database.

One or more embodiments is directed to a method including ingesting an inbound event from a connector, interfacing with one of different technology systems on a technology network, extracting at least one data element from the inbound event or at least one technology asset from the inbound event, searching a database storing a new or existing inventory of technology assets in the technology network with respect to the at least one data element or the at least one technology asset, and determining a correspondence between the at least one data element or the at least one technology asset and at least one record in the existing inventory. On condition that the at least one technology asset is extracted, create a relationship between the at least one technology asset and the at least one record in the database. On condition that the at least one data element is extracted, determining a match between the at least one data element and at least one record in the database. On condition that the match equals or exceeds a first predetermined threshold, enriching the at least one record in the database. On condition that the match is less than a second predetermined threshold, creating a new technology asset in the database.

One or more embodiments is directed to a non-transitory computer readable storage device having computer readable instructions that when executed by circuitry coupled to different technology systems on a technology network causes the circuitry to execute a method including ingesting an inbound event, generated by a connector, integrating to one or more different technology systems in a technology environment, extracting at least one data element from the inbound even or at least one technology asset from the inbound event, searching a database storing a new or existing inventory of technology assets in the technology network with respect to the at least one data element or the at least one technology asset, and determining a correspondence between the at least one data element or the at least one technology asset and at least one record in the existing inventory. On condition that the at least one technology asset is extracted, create a relationship between the at least one technology asset and the at least one record in the database. On condition that the at least one data element is extracted, determining a match between the at least one data element and at least one record in the database. On condition that the match equals or exceeds a first predetermined threshold, enriching the at least one record in the database. On condition that the match is less than a second predetermined threshold, creating a new technology asset in the database.

DETAILED DESCRIPTION

As discussed in detail below, embodiments are directed to a system, method and computer program of providing a "single source of truth" or "system of record", articulating what technology assets an organization has and providing adjacent information, such as what their business value is, what they do (function), where they are (for example in a public cloud), and their relationships with other assets, has a broad number of possible uses in an organization. This information can be used to focus on individual or small groups of assets, or in aggregate form to drive use-cases such understanding the overall "attack surface" of an organization. Such uses and challenges solved herein include, but are not limited to:

Timely identification of previously unknown business risks, such as the presence of unidentified end of life systems being utilized for critical business functions.

The high costs associated with previous asset inventory/management solutions due to a lack of automation and inability to keep up with the base of technological change in today's modern enterprise. Cost saving technologies, leveraging automation and machine learning that currently do not meet their potential, due to a lack of reliable sources of asset information. Such an example is the ability to implement security orchestration, automation and response (SOAR) technologies that take the nature of an impacted asset into consideration.

Some features of the system, method and computer program are as follows. These may be utilized together, or individually.

(1) A software as a service (SaaS) or On-Premises architecture.

(2) Leveraging existing repositories of data in a technology environment. Such data may include but is not limited to source code, development systems, endpoint management products, security incident and event management (SIEM) systems, enterprise applications, business process automation systems, IT operations management (ITOM) systems, net flow collection and analysis systems, identity and access management technologies, cloud API's, behavioral analytics systems, finance systems, business process automation systems, accounting systems and risk management systems.

(3) Provides context by providing information regarding what a technology asset is and what it does, with opportunities for machine learning.

(4) Leveraging both High fidelity data (such as cloud API endpoints) and low fidelity data (such as firewall log data, with asset-by-asset and/or aggregated confidence metrics concerning the asset data.

(5) Decentralized inventory while leveraging distributed ledger technology (DLT) based databases and queries.

(6) Complete visibility across an organizations environment. i.e., from operational technology (OT) to cloud visibility.

(7) Modular design with specialized modules, capable of serving as a platform, enabling use-case flexibility and simple extendibility.

(8) Application programming interface (API) focused system, allowing other technology systems to query and be integrated with asset data within the system.

Figure 1:
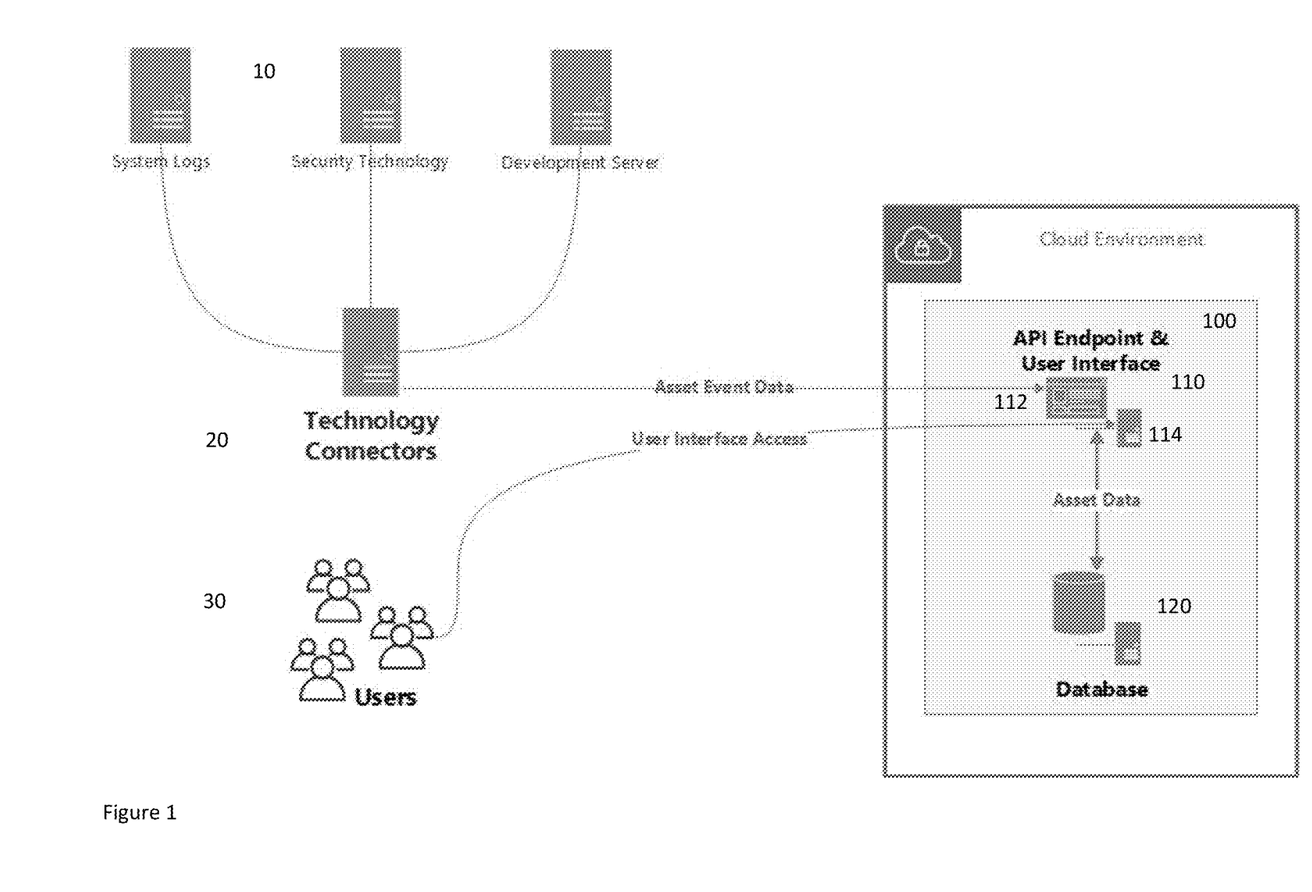
FIG. 1 illustrates an architecture including a system in accordance with an embodiment.

An overview of a system 100 is shown in FIG. 1. The system 100 may include a database 120 and circuitry 110 coupled to different technology systems 10 on a technology network and in communication with the database 120, e.g., via technology connectors 20. In particular, the circuitry 110 may include event processing circuitry 112 for processing event data from the technology connectors 20 and update the database 120 accordingly and interface circuitry 114 for providing a user interface for users 30 to query and access the database 120.

Circuitry 110 may be configured via the execution of computer readable instructions, and the circuitry may include one or more local processors (e.g., CPU's), and/or one or more remote processors, such as a cloud computing resource, or any combination thereof. Embodiments discussed herein can be implemented in suitable instructions that may reside on a non-transitory computer readable medium, hardware circuitry or the like, or any combination and that may be translatable by one or more server machines. The present technology can be configured as a form of cloud computing in which one function is shared in cooperation for processing among a plurality of devices via a network. Also, the present technology can be configured as a form of a server or IP converter in a location in which one function is shared in cooperation for processing among a plurality of devices via a network.

<Use of a Graph Database>

In order to store and later retrieve the relationships between asset entities, a graph database, which allows the creation of multiple edges between records or nodes, may be used. Edges may carry weighting values, to indicate values such as the strength of a relationship between nodes representing technology assets. The graph database also allows for the storage of properties of the technology assets for later search and retrieval. The graph database treats relationships between data as important as the data itself. This allows for the weighting of edges, representing factors such as the confidence the system has in a given relationship. Edges between nodes representing technology assets may also be created through predictions, not only direct observations.

The edges between nodes themselves can be used for a plurality of purposes, including but not limited to:

(1) Between computer system assets, which have an observed relationship to one another—identified through methods such as netflow data analytics.

(2) An edge between a system asset and a user identity asset, identified through the ingestion and analysis of user activity logs.

(3) The relationship between an application asset and systems on which that application is installed.

(4) Relationships between an application asset and a user identity, observed through source code control system committal data, or other DevOps technologies.

The use of the database enables a plurality of technologies (including but not limited to mobile devices, servers, workstations, cloud systems, cyber security technologies, telecommunications devices, satellite assets, industrial control systems) to:

(1) Publish information to the system, concerning their own device state, the existence of and meta-data concerning peer devices in their immediate environment and other data, which the end-consumer may deem relevant.

(2) Subscribe to data held within the database, to understand the existence of assets and their properties, for a plurality of use cases, to include cyber security decision making (such as security automation and orchestration), business process automation, business asset tracking, mergers and acquisitions due-diligence activities, industrial control operations, business risk assessments and complying with a plurality IT and non-IT regulatory requirements which the end-user may be subject to.

(3) Perform analysis of information in the database, utilizing machine learning and behavioral analysis methods, for the identification of patterns and abnormalities, to support a plurality of use-cases, including those previously noted.

(4) Any query that can be written targeting graph databases can be modeled in structured query language (SQL) for a conventional relational database (RDBMS) or other datastores, but it comes with incredible complexity in terms of query construction, execution, tuning, maintenance etc. In contrast to the rigid structure of a conventional RDBMS, with a graph database its relatively easy to construct queries that span across multiple entities and the simplicity in query modeling can be exposed to the end user in a domain specific language (DSL) query language.

Some examples showcasing the simplicity of a graph query based DSL:
1. To query for all users that access a system by a particular user could be as simple as:
   user.name="john doe"->type=system->type=user
2. To query for an organization's IT HelpDesk Employee starting from a system that needs attention:
   system.host="server-xyz"->org->type=user+
      title~="IT HelpDesk"

The equivalent SQL would typically involve at least two joins and multiple filters and the complexity increases with more hops added to query.

<Leveraging Diverse Data Sources>

The system for gathering and processing technology asset intelligence is capable of querying a multitude of technology systems within an organization, normalizing that information, enriching where appropriate and storing it in a database, which may be queried for a plurality of use cases, to include cyber security decision making (such as security automation and orchestration), financial systems, business asset tracking, mergers and acquisitions due-diligence activities, industrial control operations, business risk assessments and complying with a plurality of IT and non-IT regulatory requirements which the end-user may be subject to.

To gather this information, the system includes a series of technology integrations, utilized for querying a plurality of technologies, to retrieve asset data, understand their and other assets properties and other attributes concerning themselves and peer assets. The nature of the integration and the data it yields can significantly vary and may include multiple asset data types from a given integration. For example, a single integration to an endpoint management technology, could yield system asset data, user asset data and application asset data.

The breadth of integrations and respective asset data includes but is not limited to, integration with industrial control systems (such as programmable logic controllers and data historian systems), cyber security technologies, enterprise technology systems, operating systems, databases, cloud provider APIs, digital identity and access management systems and source code repositories.

These integrations are designed with a detailed understanding of the underlying technology being interfaced to such that translation between what that external system reports and the asset data models can be made.

Through a similar mechanism, the system may also identify the presence of a technology in the deployed environment, even though full information about where and how the technology is utilized is not known. For example, a finance system may report the procurement of a particular technology, indicating that technology from that vendor is, or is planned to be, deployed into the environment.

<Asset Edge Creation or "Mention" Capabilities>

Through the processing of data from technology integrations (as noted above), the system may take note that a technology asset has been referenced (or "mentioned") in metadata processed by the system. This is similar to the way in which a social network works; however, mentioning technology assets, instead of people. As an example, the system may include a technology integration with a source code repository. Through this integration, the system may identify references to technology assets embedded within pragmatic code stored in the repository. Such a reference could include, but is not limited to, programmatic instructions defining database connection strings, which would generally comprise of an IPv4 or IPv6 address, or fully qualified hostname (or FQDN). Once a mention is identified, a relationship with the asset nodes in question is created. This is implemented through the creation of a database record, such as the creation of an edge between two or more asset nodes in a graph database.

Figure 2:
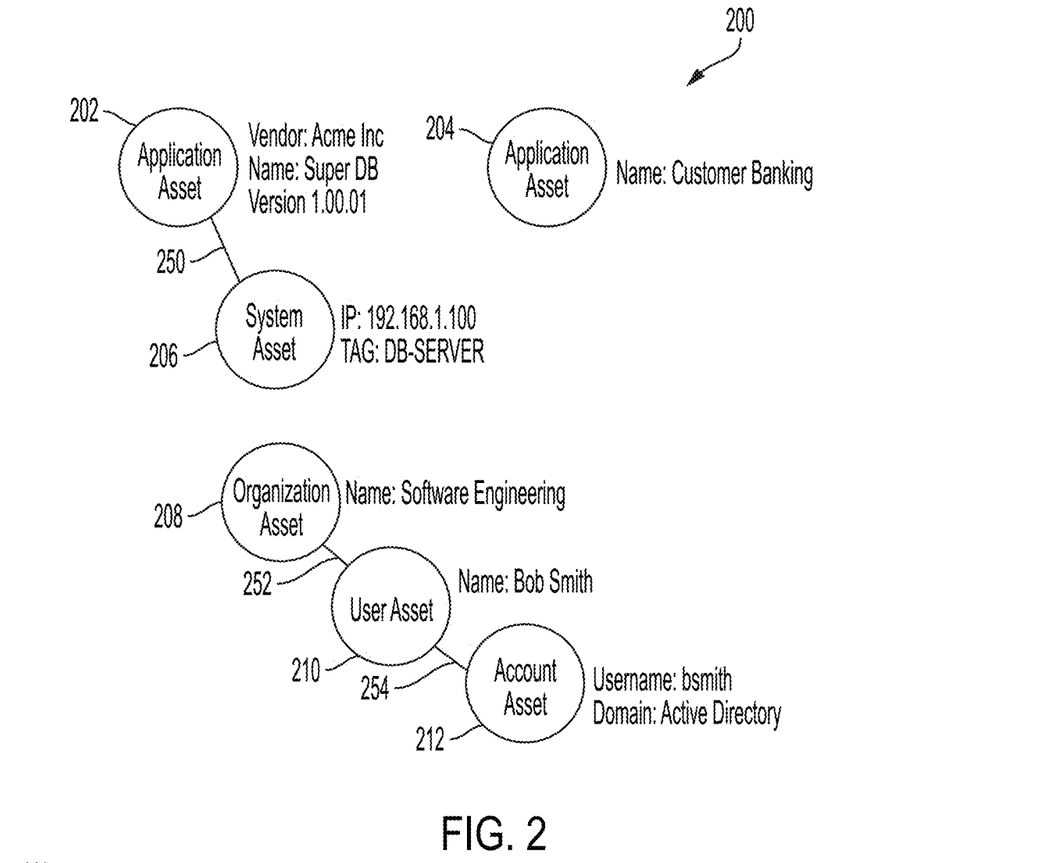
FIG. 2 illustrates a graph of technology assets including a new asset.

As an example of this feature in action, a graph 200 in FIG. 2 has asset nodes 202, 204, 206, 208, 201, and 212 representing technology assets and edges 250, 252, and 254 that indicate relationships between the asset nodes. As may be seen therein, a Customer Banking asset node 204 which has been previously discovered is not related to the other nodes, i.e., the Customer Banking application asset node 204 has no attribution or edges to an organization or context in terms of where the application is utilized in an organization. The Customer Banking application asset node 204 has not been mentioned and therefore lacks context. Providing this context is important for organizations as they seek to understand assets in their environment.

Figure 3:
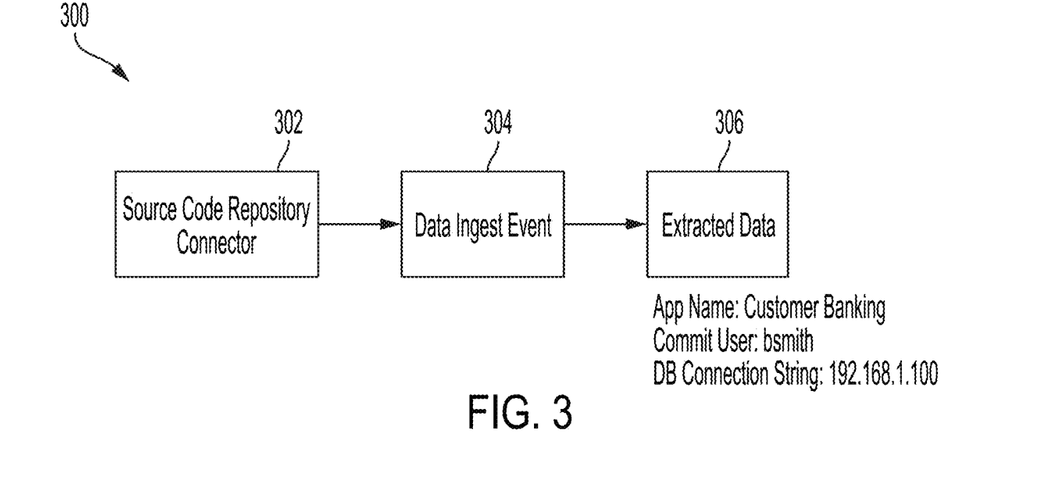
FIG. 3 illustrates an inbound event.

Continuing this example, FIG. 3 illustrates an intake process 300. When an inbound event is received from a technology integration as discussed above at operation 302, here from a source code repository connector, the system ingests the inbound event in operation 304 and extracts relevant information (in this example, a username tied to the author of the Customer Banking application and a database connection record found within the source code data) in operation 396.

Through the ingestion of the above event, the processor may establish the following relationships.

(1) The relationship between the Customer Banking application banking asset and the user with an account "bsmith."

(2) Between the Customer Banking application asset and a database server system asset, with an IPv4 address of 192.168.1.100.

(3) A predictive relationship between the database server asset and the Software Engineering organization asset. Whether or not this predictive relationship is used in the graph may be based on whether a confidence level with respect to this predictive relationship exceeds a predetermined confidence level.

Depending on the type of ingestion event and nature of the technology that generated the ingestion event, different relationships may be established.

Figure 4:
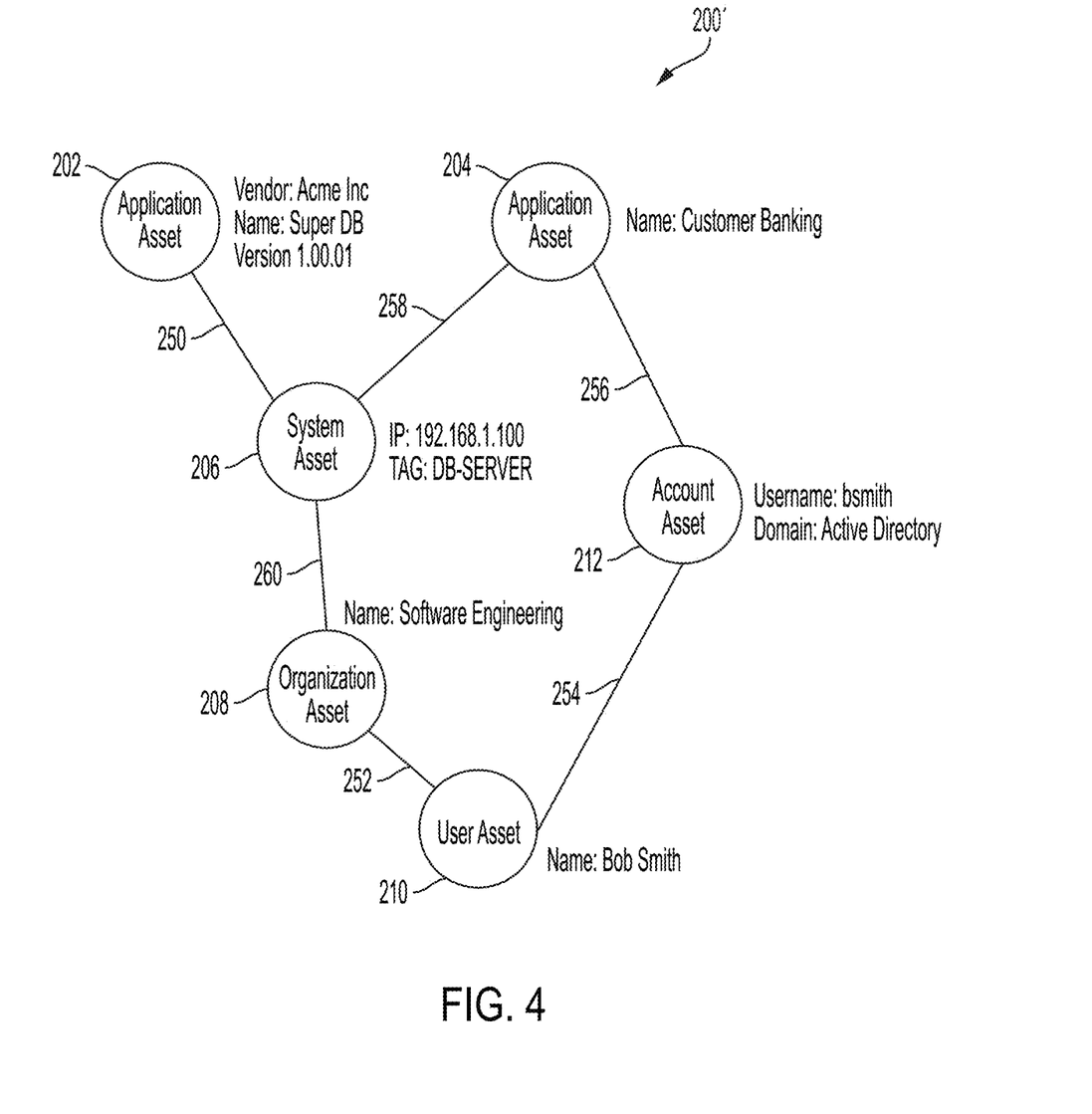
FIG. 4 illustrates connections between the nodes in the graph after ingestion of the inbound event of FIG. 3.

In practice, this is implemented through the creation edges between nodes in a graph database based on the relationships established by the intake process 300. The resultant data is visualized in a graph 200' shown FIG. 4. In particular, the updated graph 200' now includes edges or relationships 256 between node 204 and node 212 (determined from (1)), edge 258 between node 204 and node 205 (determined from (2)), and edge 260 between node 206 and node 208 (determined from (3)). This shows how the system can be used to bring immediate, previously unknown context to an application asset and user asset.

While in this example, the system leveraged existing graph data with event data from software source code, the same process could be applied to a plurality of asset types and events generated by a plurality of events from the technology integrations described above.

<Data Quality>

The system can automatically, at scale, determine how best to treat event data, with a view to maximizing the value of a given data source, allowing for real-time or historical analytics of asset data, while reducing noise in the graph, through ensuring that data is appropriately ingested and the graph properly updated.

First, the system ingests a plurality of data elements to identify the presence of a possible asset in a technology environment (such as a network). Such data elements may include, but are not limited to, system logs, firewall logs, netflow information, endpoint data, user access logs, network device routing and state tables and packet capture metadata. These plurality of data elements may indicate the existence of a possible asset in the environment without necessarily revealing many details of attributes of the asset itself. For the purposes of this system, we term this as low fidelity data. While low fidelity may not provide sufficient information for many end user use-cases of the system, the identification of the presence of the asset in the environment carries some value. Other data contained in ingestion events, with a higher fidelity level, may be used to build more complete database records concerning that asset. Regardless of the fidelity of the data in the ingested event, it may be used to either create new asset records, enrich existing asset records, establish relationships, or perform other operations in the system.

Second, the system consumes the data elements contained within the ingestion event and performs analysis of them with asset data contained within the system, for a plurality of purposes, including: (1) establishing whether the ingested event data, relates to an existing asset record or records within the asset inventory. This process is aimed at posing a binary (yes/no) question, whose answer can be used to identify a number of factors; and (2) performing analysis of data ingested through the first and second methods, to create confidence statistics regarding the completeness of data concerning a particular asset. While the existence of record is a binary (yes/no), to what extent the record matches the data element is not. When a match between the data element and a record in the existing asset inventory equals or exceeds a first threshold, the data element may be used to enhance the record. When a match between the data element and the record is less than a second predetermined threshold, which is less than or equal to the first predetermined threshold, a new asset may be created in the database. When a match between the data element and the record is between the first and second thresholds, additional policies may be used to determine how to treat the data element and other thresholds may be applied with the first and second threshold to make this determination.

This is achieved through an ingest policy. The policy applies a set of rules, to determine the treatment of data elements contained within an event. The policy itself may be either statically created, or dynamically created and/or tuned through secondary analytics, leveraging technologies such as machine learning, to continually tune and improve the policy—reducing false positives, false negatives and therefore improving the handling of data ingested into the database.

Figure 5:
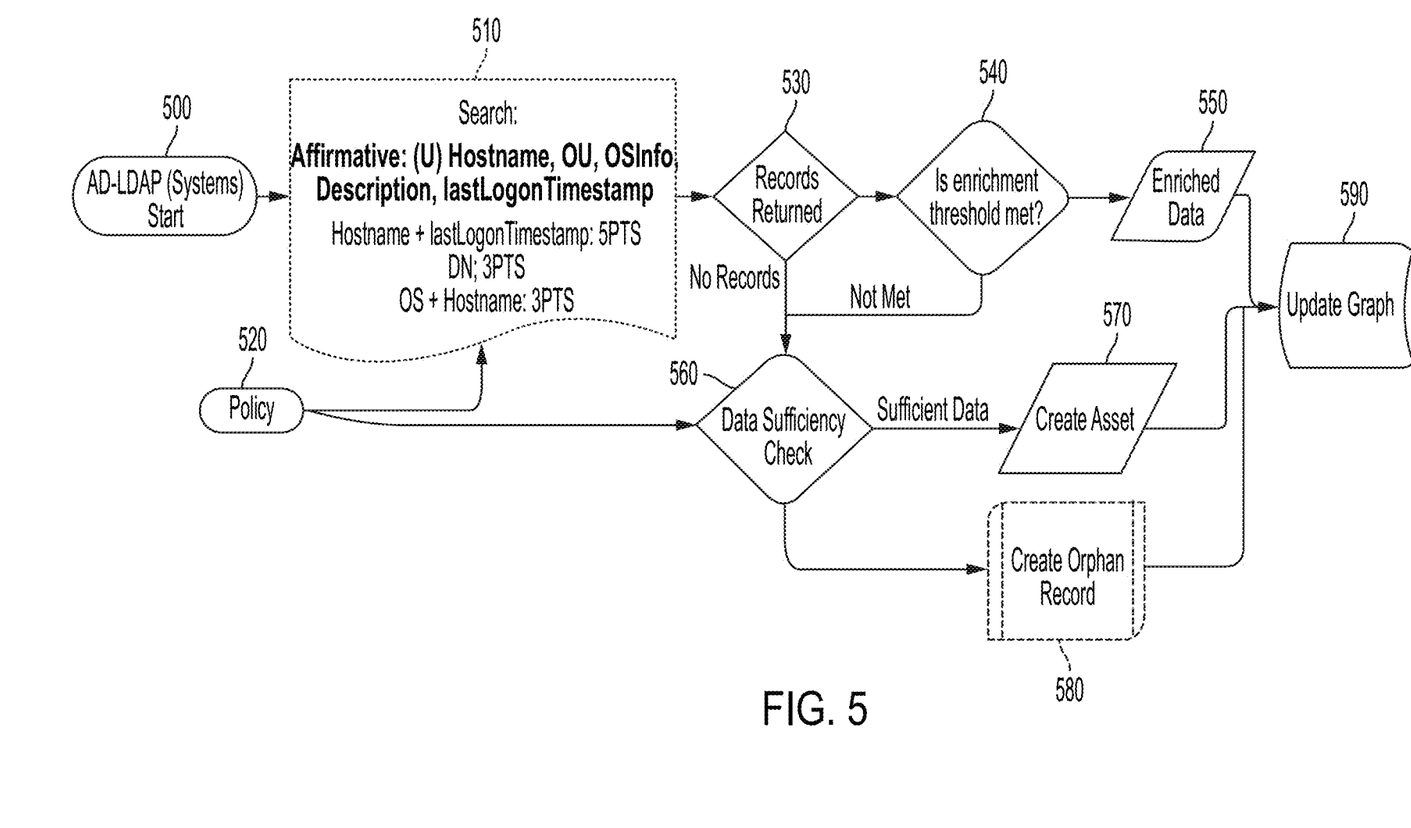
FIG. 5 illustrates a flow of an ingest policy.

When leveraging the rules, the policy engine will broadly conduct a series of steps. An example of the processing of such a policy, is illustrated in FIG. 5:

(1) Operation 500 reads the type of event being ingested from a connector, here active directory LDAP data and outputs the type of event and data elements of the event.

(2) Operation 510 assesses the source of the event (i.e., the originating technology which was responsible for creating the data held within the event).

(3) Operation 510 reads a rule set from policy parameters 520 for the observed source/technology and applies the rule set to the observed source/technology.

(4) Operation 510 looks in external datastores for fingerprinting a technology asset based on the data elements of the event.

(5) Operation 510 scores the event, i.e., data element(s) of the event, based on the information contained within the event and in accordance with the rule for that source/technology (or connector). The score is a determination of how likely data elements contained within the event, pertains to existing records in the database, i.e., an existing technology asset. For example, if a hostname and a last logon time stamp match an existing asset, this is worth 5 points; if a directory name matches that of an existing technology asset, this is worth 3 points; and if an operating system and hostname match, this is worth 3 points.

(6) Operation 530 determines if any records are returned by operation 520. If so, proceed to operation 540 to determine whether a first predetermined threshold is met.

(6) In operation 540, if the score meets or exceeds a first predetermined threshold, e.g., 5, the event data can be used to enrich an existing asset record in the graph database.

(7) If the score fails to meet the score criteria in operation 540 or if no records are returned by operation 520, proceed to operation 560.

(8) If operation 560 determines there is sufficient data to create a new asset, in accordance with a policy read from policy parameters 520, the event data elements may then be utilized to create new asset record in operation 570, on condition that the system 100 has made a reasonable determination that no existing asset record exists, i.e., a match is less than a second predetermined threshold, relating to the data elements contained within the event.

(9) If operation 540 determines that the enrichment threshold has been reached (i.e., an existing asset record has been identified), the system proceeds to step 550, then proceeding to update the database with the additional data from the connector.

(10) If operation 560 determines there is not sufficient data to create a new asset, in accordance with a policy read from policy parameters 520, on condition that the system 100 has made a reasonable determination that no existing asset record exists, the event data elements may then be utilized to create an orphan record or placeholder in operation 580 that may be later used to create a new, or enrich an existing asset.

(11) In operation 590, the database, e.g., a graph database, is updated appropriately.

The system 100 may leverage caching or bloom filters to improve the performance of steps taken in 510, 540 and 560.

<Overall Inbound Event Flow>

Figure 6:
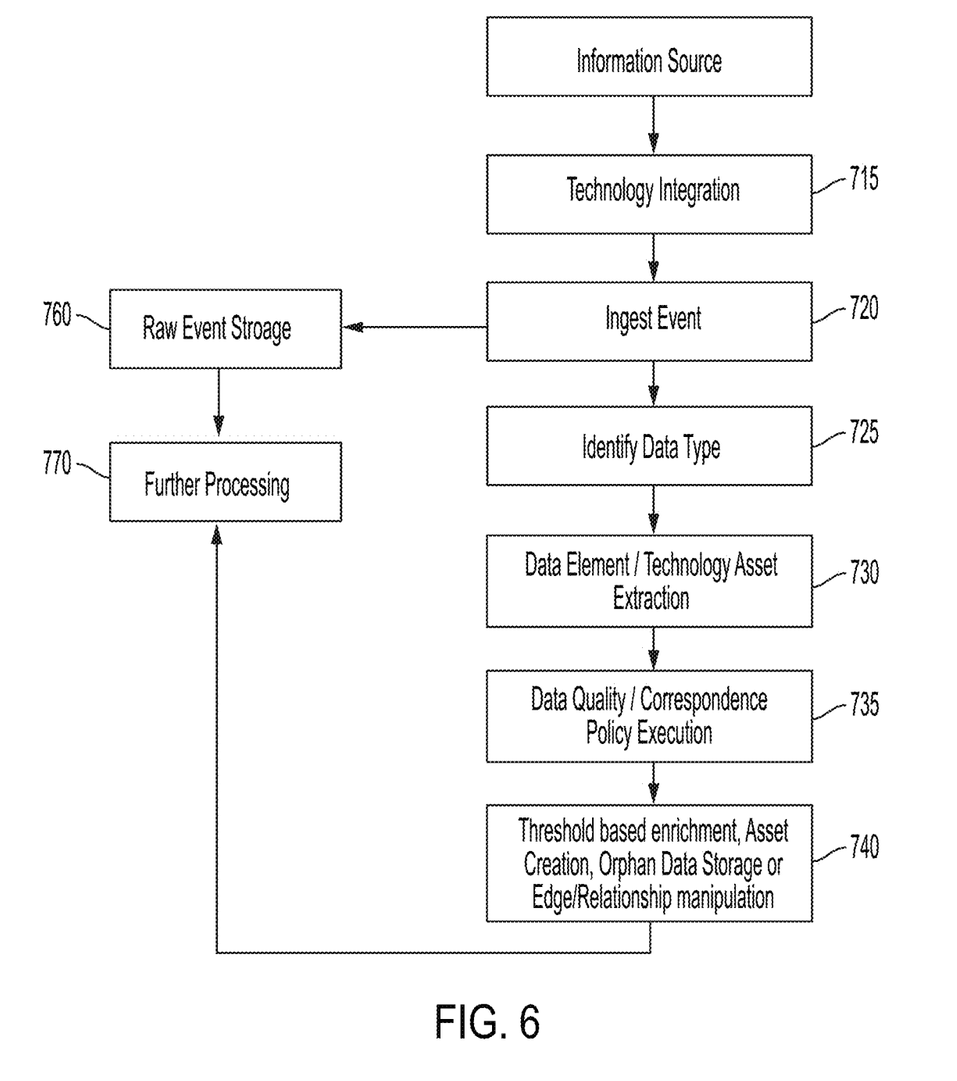
FIG. 6 illustrates a flowchart of an inbound event.

FIG. 6 illustrates an overall flowchart for generating an inbound event and then processing the inbound event by the circuitry 110. Before an inbound event is received by the circuitry 110, in operation 705, one or more information sources sends event data to be subject to technology integration in operation 715. The circuitry 110 receives the inbound event from the technology integration and, in operation 720, the inbound event is ingested (see FIGS. 3 and 5). In operation 725, the identity of the data type is determined, e.g., data element, technology asset, etc. The data is then extracted in operation 730 (see FIGS. 3 and 5). Operation 735 searches the database 120 for correspondence with records in the database 120 in accordance with an appropriate policy (see FIGS. 4 and 510-530 in FIG. 5). Once correspondence is found, operation 740 updates the database 120 to manipulate a relationship between the technology asset and the record in the database 120 (FIG. 4), enrich the record if a match exceeds a first predetermined threshold (see 540 and 550 in FIG. 5), create an asset if a match is below a second predetermined threshold and there is sufficient data (see 560 and 570 in FIG. 5), store an orphan record if there is insufficient data (see 560 and 580 of FIG. 5), and/or proceed to further processing in operation 770. The flow may further include storing raw event data in operation 760, which may be further processed in operation 770.

<Graph Analytics>

The system 100 may represent asset information through a series of visualizations. The goal is to display data pertaining to a given asset or plurality of assets, showing the relationships and optionally the strength of those relationships between assets. A given visualization may vary given the end use-case. Broadly speaking, visualizations may be broken down into two categories.

First, when viewing a large amount of asset data, indicating trends in a technology environment or environments. This is not too dissimilar from a heat-map type concept, except the data may be more easily explored. Such an example of how this method may be applied, includes providing the end user with an understanding of how server operating system versions are distributed across an environment of a technology environment. This example is helpful both tactically and strategically, to enable and take action on a server upgrade effort.

Second, those that are focused on a small grouping of technology assets as a starting point. The system would typically be interacted with to further explore and expand the graph visualization to provide further context around the assets of particular interest to the user. Such an example of how this method may be applied, includes searching the database for a user asset, based on a username. The visualization may then simply render a node representing that user, which may be interacted with to expand relationships (or edges) connecting that user to other assets in the database, such as associated system assets, applications, or organizations.

Figure 7:
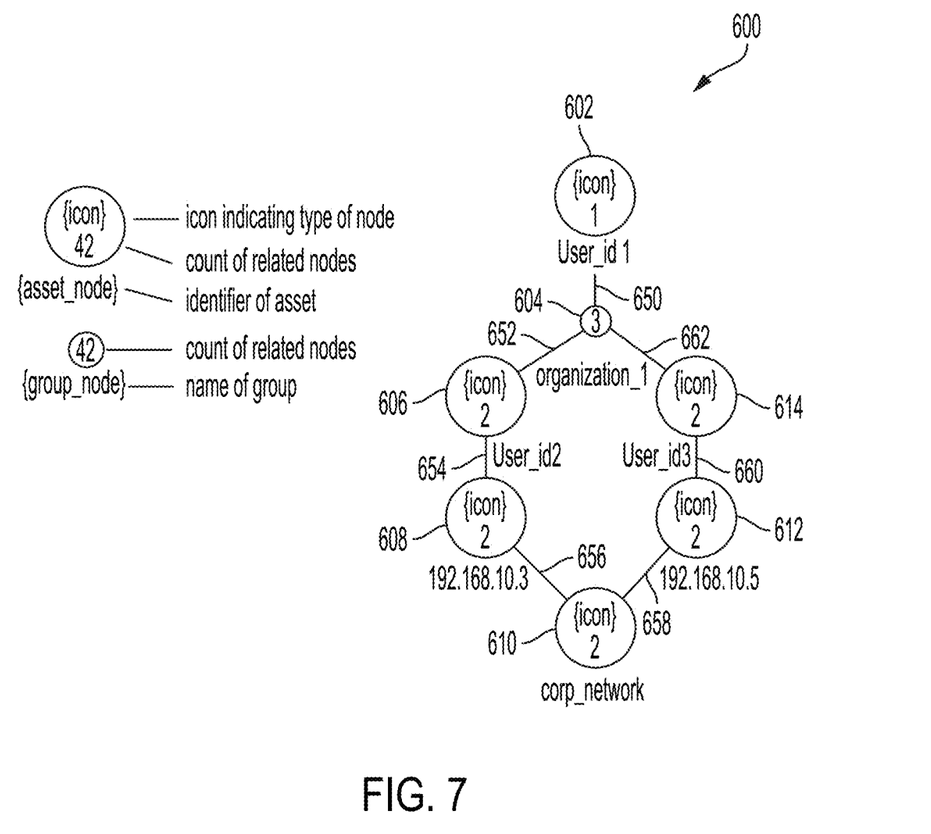
FIG. 7 illustrates an asset intelligence graph.

In FIG. 7, a graph 600 includes technology asset nodes 602, 606, 608, 610, 612 and 614, a group node 604, and edges 650, 652, 654, 656, 58, 660, and 662. For example, the node 608 with the IPv4 address 192.168.10.3 with a number of secondary nodal attributes, identifying pertinent information about the technology asset, including an observed relationship with a secondary node, with the IP address of 192.168.10.5. This graphical user interface may be interacted with, to further explore information regarding this and other assets. Such an interaction may include clicking on a node, or information bubble regarding an asset, to "expand" the visual graph. As shown in FIG. 7, each asset note may include an icon indicating a type of node, a count of related nodes, and an identifier of an asset. Each group node may include a group name and a count of relates nodes.

Figure 8:
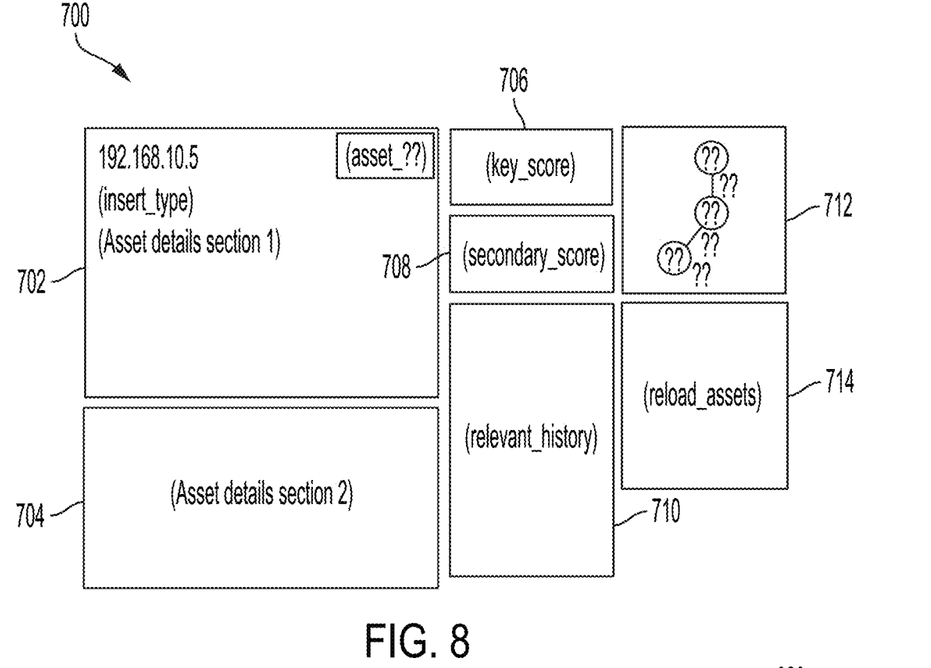
FIG. 8 illustrates an asset intelligence details screen.

These nodes may be interacted with in a variety of manners. For example, selecting the node 612 with the IPv4 address 192.168.10.5 may result in a details screen 700 of FIG. 8, in which additional details of the node may be viewed, along with a subset of the graph of FIG. 7, e.g., only immediately connected nodes, i.e., nodes 610 and 614, in a window 712. The screen 700 may also include a window 702 displaying particular asset detail, a window 704, displaying further asset details, a window 706 displaying a key score identifying the asset, a window 708 displaying a secondary score identifying the asset, a window 710 displaying relevant history of the asset, and window 714 displaying related assets.

<Platform Applications>

Figure 9:
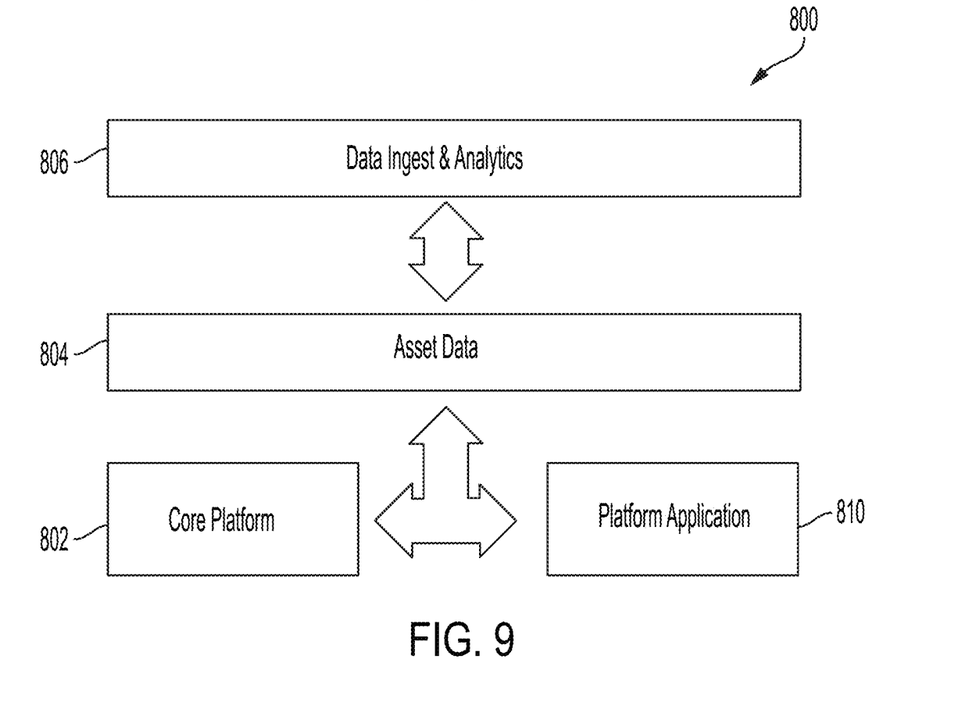
FIG. 9 depicts a high-level architecture leveraging a platform application.

Asset data and derived information (such as analytics or visual representations) contained within the described system, may be extended and used for a plurality of purposes, leveraged by secondary applications which are purpose built to leverage the system described, e.g., to provide additional security or visualization functionality. Such applications may be installed (enabled) and disabled, as modular "add-ons" into the system, and may be contributed by a community of developers (i.e., an app-store-like environment), e.g., third party developers. As shown in a high-level depiction in FIG. 9, a platform architecture 800 may include a core platform 802, asset data 804, and a data ingest and analytics of the system 806, a platform application 808. Platform applications 808 can subscribe to and publish data from/into the core platform 802 in order to extend functionality of the system 100. Such an application installed into the system could include a Technology Transformation "app", leveraging data from the system, to inform an end-user how a technology migration (such as a move to Cloud computing) may be best approached, or identifying opportunities for technology cost savings through rationalization of technologies, described by the database system.

<Asset Utility>

The system 100 can determine a likely utility type of a system asset. Such utility types may include, but are not limited to, technical utility (ex. Server, Workstation, Mobile Device) and business-level utility (e.g., a server involved in finance reporting; a web server responsible for a customer web application) etc.

In order to establish a likely asset utility type, the system performs analysis of event data and existing database edge relationships, derived from multiple sources including, but not limited to, user access events and behaviors, user identity directory data, application-level data, system and application access data, source code, asset and organization information.

Figure 10:
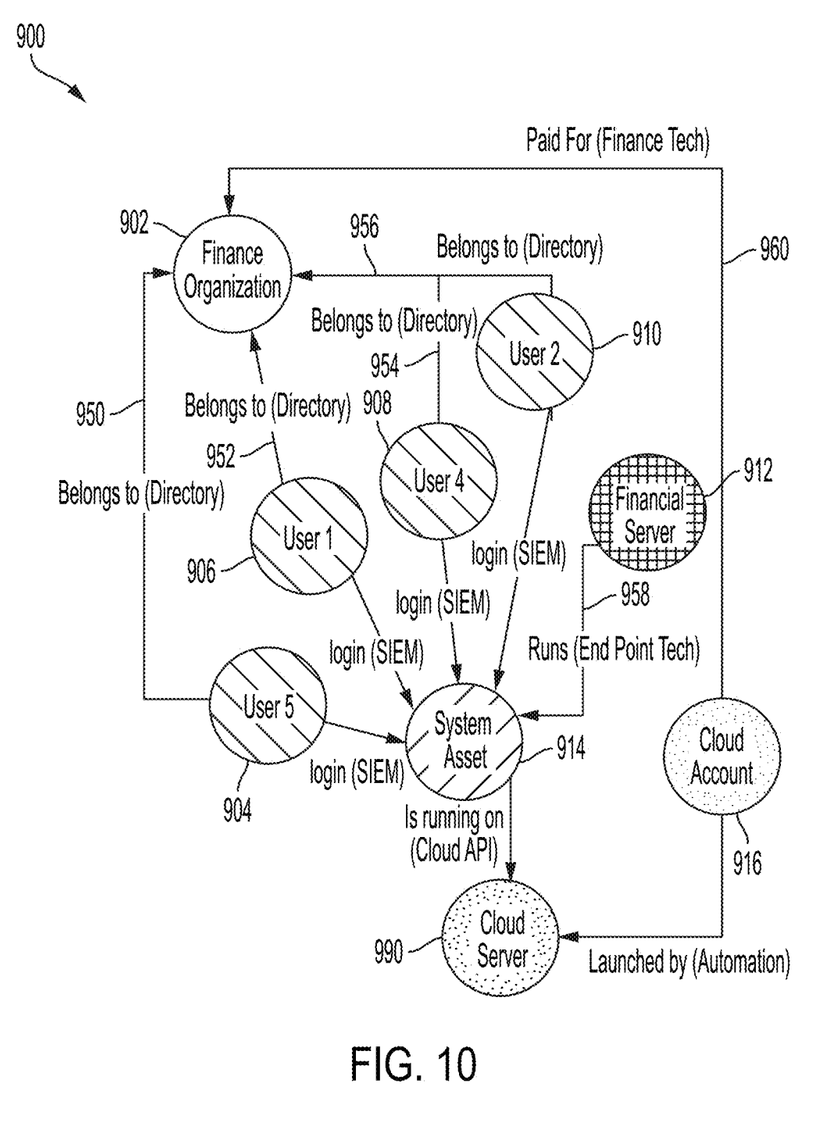
FIG. 10 illustrates a graph showing relationships between assets used to determine a utility type of an asset.

In FIG. 10, a graph 900 includes nodes 902, 904, 906, 908, 910, 912, 914, and 916, and edges 950, 952, 954, 956 between nodes. The system asset 914 may run on a cloud server 990. The user assets 904, 906, 908, and 910 have been found to authenticate to the organization node 902 to which those user assets belong and as the party financially responsible for the infrastructure the asset 916 was launched on are shown. No single data source provides the entire body of relationships required to ascribe the utility type of an asset. In this example, data from multiple connectors are used to build the edges in the graph that allows determination of the organization ultimately utilizing an asset. From this graph 900, this system asset 916 is owned by the Finance organization 902 primarily for running financial software used by their users for business operations and reporting purposes, i.e., an edge 960 between node 902 and node 916, can be inferred with high confidence, i.e., a confidence level for this edge exceeds a predetermined level.

This analysis can also be utilized in the system and by end-users to determine the significance of, i.e., utility type of, a technology asset within a broader technology environment. Such observations may include the importance of the technology asset, established through secondary analysis methods such as observing the volume and type of users and organizations using a given system asset, or grouping of technology assets. The utility record is dynamic and can change over time as observable changes in the technology environment are captured. The utility observation can apply to a single or group of assets in the system and score can be used for a multitude of end business purposes, such as informing IT upgrade/refresh decisions, IT consolidation and cost reduction activities and digital transformation decisions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Obviously, numerous modifications and variations of the present invention are possible in light of the above teachings. It is therefore to be understood that within the scope of the appended claims, the invention may be practiced otherwise than as specifically described.

What is claimed is:

1. A system, comprising:
   circuitry coupled to different technology systems on a technology network; and
   a database storing a new or existing inventory of technology assets in the technology network and coupled to the circuitry, wherein the circuitry is configured to:
     ingest an inbound event from one of the different technology systems;
     extract at least one data element from the inbound event or at least one technology asset from the inbound event;
     search the database with respect to the at least one data element or the at least one technology asset; and
     determine a correspondence between the at least one data element or the at least one technology asset and at least one record in the existing inventory;
     wherein, on condition that the at least one technology asset is extracted, create a relationship between the at least one technology asset and the at least one record in the database,
     wherein, on condition that the at least one data element is extracted, determine a match between the at least one data element and the at least one record in the existing inventory,
       on condition that the match equals or exceeds a first predetermined threshold, enrich the at least one record in the database,
       determine whether there is sufficient data to create a new technology asset in accordance with a rule set read from predetermined policy parameters, wherein the rule set is specific to an originating technology that was responsible for creating the data element found within the inbound event,
       on condition that the match is less than a second predetermined threshold, wherein an extent to which the second predetermined threshold matches the data element is less than and not equal to the extent to which the first predetermined threshold matches the data element, and that the at least one data element has sufficient data to create the new technology asset, create the new technology asset in the database, and
       on condition that the at least one data element does not have sufficient data, in accordance with the policy read from the predetermined policy parameters, to create the new technology asset, creating an orphan record in the database.

2. The system of claim 1, wherein the circuitry is part of a computing platform including other applications.

3. A method, comprising:
   ingesting an inbound event from a connector, interfacing with one of different technology systems on a technology network;
   extracting at least one data element from the inbound event or at least one technology asset from the inbound event;
   searching a database storing a new or existing inventory of technology assets in the technology network with respect to the at least one data element or the at least one technology asset; and
   determining a correspondence between the at least one data element or the at least one technology asset and at least one record in the existing inventory;
   wherein, on condition that the at least one technology asset is extracted, creating a relationship between the at least one technology asset and the at least one record in the database,
   wherein, on condition that the at least one data element is extracted, determining a match between the at least one data element and at least one record in the database, and
     on condition that the match equals or exceeds a first predetermined threshold, enriching the at least one record in the database,
   determining whether there is sufficient data to create a new technology asset in accordance with a rule set read from predetermined policy parameters, wherein the rule set is specific to an originating technology that was responsible for creating the data element found within the inbound event,
   on condition that the match is less than a second predetermined threshold, wherein an extent to which the second predetermined threshold matches the data element is less than and not equal to the extent to which the first predetermined threshold matches the data element, and that the at least one data element has sufficient data to create the new technology asset, creating the new technology asset in the database, and
   on condition that the at least one data element does not have sufficient data, in accordance with the policy read from the predetermined policy parameters, to create the new technology asset, creating an orphan record in the database.

4. The method of claim 3, wherein determining the match includes:
   scoring the inbound event to generate a score, and
   using the score as the match.

5. The method of claim 4, wherein scoring the inbound event includes:
   assessing a source of the inbound event;
   looking up a rule set that applies to the source; and
   scoring the inbound event based on information within the inbound event and in accordance with the rule set for the source.

6. The method of claim 3, wherein determining the match includes generating a confidence score associated with the match.

7. The method of claim 3, further comprising:
generating a graph database of the existing inventory, the graph database storing a graph including nodes representing technology assets and edges representing relationships between the nodes; and
analyzing relationships in the graph database and event data to determine a utility type of a particular technology asset in the existing inventory.

8. The method of claim 3, wherein the database is a graph database storing a graph including nodes representing technology assets and edges representing relationships between the nodes, and the method further comprises displaying the graph of the graph database.

9. The method of claim 8, wherein the graph is an interactive graph.

10. The method of claim 9, further comprising, when a node of the graph is selected, displaying additional data regarding the node.

11. The method of claim 10, further comprising displaying a table of properties of the selected node.

12. The method of claim 8, wherein creating the relationship includes at least one of:
creating an edge between technology assets that have an observed correspondence between one another;
creating an edge between a system technology asset and a user identity technology asset based on a user activity log;
creating an edge between an application technology asset and a system technology asset on which the application technology asset is installed; and
creating an edge between an application technology asset and a user identity technology asset observed through version control.

13. The method of claim 3, further comprising:
using an application programming interface to communicate between the database and the different technology systems.

14. The method of claim 3, the method further comprising:
writing data from a technology asset to the database regarding that technology's asset state, information regarding existence and data elements of technology assets in an immediate environment of that technology asset;
reading, from the database, technology assets and their properties for specific use cases; and
analyzing the database to identify patterns within specific use cases; and
conducting queries that span the different technology systems.

15. The method of claim 3, wherein, when the correspondence is a predictive relationship, creating the relationship on condition that a confidence level with respect to the connection exceeds a predetermined confidence level.

16. A non-transitory computer readable storage device having computer readable instructions that when executed by circuitry coupled to different technology systems on a technology network causes the circuitry to execute a method comprising:
ingesting an inbound event, generated by a connector, integrating to one or more different technology systems in a technology environment;
extracting at least one data element from the inbound even or at least one technology asset from the inbound event;
searching a database storing a new or existing inventory of technology assets in the technology network with respect to the at least one data element or the at least one technology asset; and
determining a correspondence between the at least one data element or the at least one technology asset and at least one record in the existing inventory;
wherein, on condition that the at least one technology asset is extracted, create a relationship between the at least one technology asset and the at least one record in the database,
wherein, on condition that the at least one data element is extracted, determining a match between the at least one data element and at least one record in the database, and
on condition that the match equals or exceeds a first predetermined threshold, enriching the at least one record in the database,
determining whether there is sufficient data to create a new technology asset in accordance with a rule set read from predetermined policy parameters, wherein the rule set is specific to an originating technology that was responsible for creating the data element found within the inbound event,
on condition that the match is less than a second predetermined threshold, wherein an extent to which the second predetermined threshold matches the data element is less than and not equal to the extent to which the first predetermined threshold matches the data element, and that the at least one data element has sufficient data to create the new technology asset, creating the new technology asset in the database, and
on condition that the at least one data element does not have sufficient data, in accordance with the policy read from the predetermined policy parameters, to create the new technology asset, creating an orphan record in the database.

17. The non-transitory computer readable storage device of claim 16, wherein the circuitry is part of a computing platform including other applications.

* * * * *